E. P. ALLEN.
RADIATOR VALVE.
APPLICATION FILED MAY 5, 1906.
957,593.
Patented May 10, 1910.
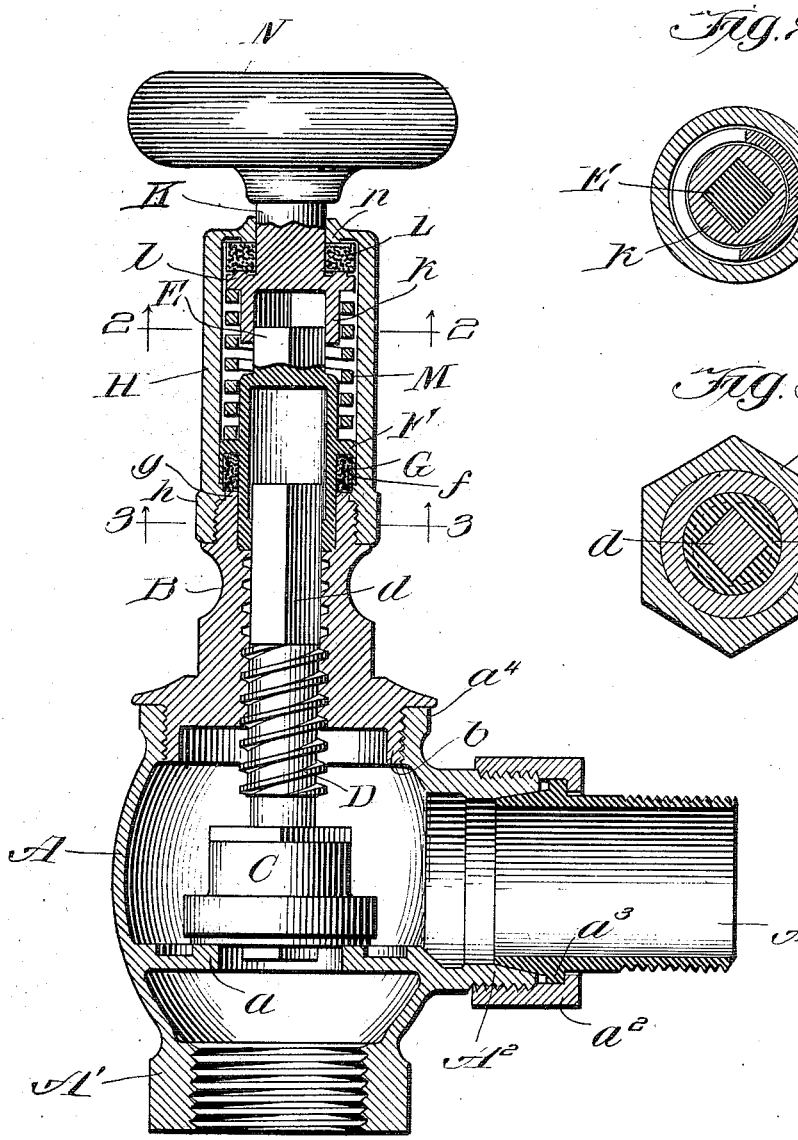
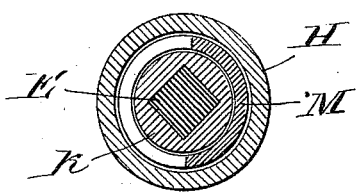
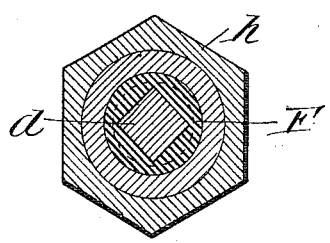

UNITED STATES PATENT OFFICE.

EVERETT P. ALLEN, OF CHICAGO, ILLINOIS, ASSIGNOR TO NORWALL MANUFACTURING COMPANY, OF CHICAGO, ILLINOIS.

RADIATOR-VALVE.

957,593.  Specification of Letters Patent.  Patented May 10, 1910.

Application filed May 5, 1906. Serial No. 315,271.

*To all whom it may concern:*

Be it known that I, EVERETT P. ALLEN, a citizen of the United States, residing at Chicago, county of Cook, State of Illinois, have invented a certain new and useful Improvement in Radiator-Valves, and declare the following to be a full, clear, and exact description of the same, such as will enable others skilled in the art to which it pertains to make and use the same, reference being had to the accompanying drawings, which form a part of this specification.

My invention relates in general to valves for controlling the flow of fluid through a conduit, and more particularly to valves used in heating systems intermediate of the radiators and pipes for supplying the heating medium.

It is customary in steam and hot water heating systems to provide hand-operated valves for controlling the flow of the heating medium to the radiator. Much difficulty is experienced in preventing leaking of the heating medium for the valve casings into which the valve operating stems extend. Trouble is also caused by the relatively rotating parts sticking when heated. It is usual to provide packing of some sort around the valve stems which is however objectionable owing to the fact that the materials best adapted for producing a tight joint deteriorate from contact with the steam and packings formed of other materials become loose with usage. The leakage is increased by the wear imposed upon the packing by the rotation of the valve stem relatively to the casing in opening and closing the valve.

The primary object of my invention is to provide a valve controlling the flow of fluid through a conduit the relatively rotating parts of which will not stick when heated, and which will be at all times proof against leakage.

A further object of my invention is to provide a valve which may be quickly opened and closed, and which will be simple in construction, inexpensive in manufacture, and efficient in use.

The embodiment of my invention herein disclosed may be generally described as consisting of a valve casing, a valve seat within said casing, a valve coöperating with said seat, a two-part rotary valve stem extending within said casing but axially immovable with respect thereto, means for connecting the two parts of said stem to permit axial movement but to prevent relative rotary movement, a flange projecting around each part of said stem, circular seats in said casing coöperating with said flanges, means for forcing said flanges against the coöperating seats, and operative connections whereby a rotation of the stem will move the valve toward and away from its seat.

My invention will be more fully described hereinafter with reference to the accompanying drawings in which the same is illustrated as embodied in a convenient and practical form and in which,—

Figure 1 is a central sectional view; Fig. 2 a horizontal view on line 2—2 Fig. 1, and Fig. 3 a horizontal section on line 3—3 Fig. 1.

Similar reference characters are used to designate similar parts in the several figures of the drawings.

Reference letter A designates a valve casing which is adapted to be interposed between a conduit for a heating medium and a radiator. A′ indicates an interiorly screw-threaded coupling formed integrally with the valve casing which is adapted to be united to the conduit through which the heating medium flows.

$A^2$ indicates an exteriorly screw-threaded coupling formed integrally with the casing and adapted to be connected with the radiator by suitable means, such for instance as a short pipe section $A^3$ having a rib $a^3$ thereon which is engaged by a ring $a^2$, the latter being in screw-threaded engagement with the coupling $A^2$.

B indicates a bonnet or tubular extension of the valve casing provided with an exteriorly screw-threaded lower end $b$ which is received within the upper end of the valve casing pipe.

C indicates a valve located within the casing and coöperating with a valve seat $a$ therein.

D indicates a valve shank rigidly connected to the valve and provided with an exteriorly screw-threaded portion engaging a screw-thread formed on the interior of the extension B of the casing. The upper end $d$ of the shank D is square in cross section and is received within a square opening in the lower end of a two-part valve stem.

E indicates the lower part of the valve stem which is square at its upper end and received within a square socket $k$ in the lower end of the upper part K of the valve stem.

N indicates a hand disk fixed to the upper end of the valve stem whereby rotary motion may be imparted thereto.

H indicates a cylindrical cap which also forms an extension of the valve casing. The lower end $h$ of the cap is interiorly screw-threaded and engages the exteriorly screw-threaded end of the portion B of the casing. The upper end of the cap H extends closely around the portion K of the valve stem.

A flange F projects around the lower portion of the valve stem above the end $g$ of the part B of the casing. A ring $f$ depends from the outer edge of the flange F and forms therewith a groove in which is preferably located a ring G engaging the upper end of the part B of the casing. The ring G is made of suitable material which will not be affected by the heat and which will prevent leakage between the same and the end $g$ which serves as a seat therefor.

The upper part K of the valve stem is also provided with a laterally projecting flange $l$ between which and the inner surface of the upper end of the cap H is inserted a ring L of suitable material, preferably formed of a composition similar to that of which the ring G is formed. A spring M is interposed between the flanges F and $l$ the tension of which forces the flanges in opposite directions and consequently retains the rings G and L in close contact with the respective seats $g$ and $n$.

The operation of my invention is as follows: By rotating the hand disk N toward the left the valve C will be moved away from its seat $a$ by reason of the engagement of the screw threads on the shank D with the screw threads within the bonnet B of the casing. The rotary motion applied to the disk N is communicated to the shank D through the interposed stem K the parts of which are connected so as to rotate together, and through the engagement between the lower part of the stem and the upper end of the shank which are also so connected as to rotate together. The valve may be closed by rotating the hand disk D in an opposite direction. The leakage of the fluid is prevented both by the engagement between the ring G and seat $g$ and by the engagement between the ring L and seat $n$.

From the foregoing description it will be observed that I have invented an improved valve adapted for use as a basin cock, faucet, gate or globe valve, which may be quickly opened and closed by a slight rotary movement imparted to the valve stem, which will at all times prevent leakage of fluid, and in which the relatively movable parts will not stick when heated. It will be further observed that my improved valve is adapted to prevent leakage from systems containing a heating medium under pressure above the atmosphere and also to prevent the admission of air through the valve casing to a vacuum heating system. The inner ring G prevents the leakage of pressure to the atmosphere, while the ring L prevents the admission of air to a vacuum system, it being understood, however, that both rings coöperate to prevent leakage either of pressure to the atmosphere or of air to the system. It will be still further observed that the joint within the casing will not be affected by any tilting to which the upper portion of the valve stem may be subjected when the valve is opened or closed owing to the valve stem being made in two parts.

Having now fully described my invention, what I claim as new and desire to secure by Letters Patent is:

1. The combination with a valve casing comprising a casing proper, a bonnet and a cap, of a valve seat in said casing, a valve coöperating with said seat, a two-part rotary valve stem extending within said cap and bonnet but axially immovable relatively thereto, means for connecting the two parts of said stem to prevent relative rotary movement, a flange formed around each part of said stem, seats in said casing coöperating with said flanges a spring surrounding said stem and interposed between said flanges for forcing the same toward the coöperating seats, and operative connections whereby a rotation of said stem will move said valve toward and away from its seat.

2. The combination with a valve casing having a bonnet, of a valve within said casing, a valve stem operatively associated with said valve and projecting through said bonnet, said bonnet having a seat on its outer edge, a cap surrounding said valve stem and screw-threaded upon said bonnet, a loose connection in the stem within the cap, a bearing seat within the outer end of the cap, flanges on said stem on opposite sides of the loose connection, and means for forcing said flanges toward the seats on the bonnet and on the cap, respectively.

3. The combination with a valve casing having a bonnet, of a valve within said casing, a valve stem operatively associated with said valve and projecting through said bonnet, said bonnet having a seat on its outer edge, a cap surrounding said valve stem, and screw-threaded upon said bonnet, a loose connection in the stem within the cap, a bearing seat within the outer end of the cap, flanges on said stem on opposite sides of the loose connection, means for forcing said flanges toward the seats on the bonnet and on the cap, respectively, and a bearing ring arranged between each of said flanges and the seat coöperating therewith.

4. The combination with a valve casing having a bonnet of a valve within said casing, a valve stem operatively associated with said valve and projecting through said bonnet, said bonnet having a seat on its outer edge, a cap surrounding said valve stem and screw-threaded upon said bonnet, a loose connection in the stem within the cap, a bearing seat within the outer end of the cap, flanges on said stem on opposite sides of the loose connection, and a spring surrounding said stem between the flanges for forcing said flanges toward the coöperating bearing seats.

5. The combination with a valve casing having a bonnet, a valve within said casing, a valve stem projecting through said bonnet, a cap surrounding said valve stem and secured to the bonnet, a loose connection in said stem within the cap, a bearing between said stem and the cap arranged transversely to the stem at one side of the loose connection, and a similar bearing between the stem and the bonnet on the other side of said loose connection, and a second loose connection between the portion of the stem within the bonnet and the portion within the cap.

6. The combination with a valve casing having a bonnet, a valve in said casing, a valve stem projecting through said bonnet, a cap surrounding the stem and secured to the bonnet, a loose connection in the stem within the cap, a transverse bearing between the stem and the cap at one side of the loose connection, a similar bearing between the stem and the bonnet at the other side of the loose connection, and a second loose connection in the valve stem between said latter bearing and the valve.

7. The combination with a valve casing, a valve within said casing, a valve stem projecting through said casing the outer edge of said casing about the valve stem being in the form of a seat, a cap surrounding the valve stem and secured to the casing, said cap having a seat formed within its outer end transversely to the stem, a loose connection in said stem within the cap, flanges on said stem on opposite sides of the loose connection, means for forcing said flanges toward said seats, and a second loose connection between the portions of the stem within the cap and within the casing.

8. The combination with a valve casing, a valve within the casing, a valve stem projecting out of the casing, said casing having its outer edge formed into a seat about the valve stem, a cap adjustably secured to said casing and surrounding the projecting portion of the valve stem, said cap being provided with a bearing seat arranged transversely to, and surrounding the outer end of the valve stem, a loose connection in said valve stem within the cap, flanges on said stem on opposite sides of the loose connection, a spring surrounding the valve stem for forcing the flanges toward said seats, and a second loose connection between the portion of the stem within the cap, and the portion within the valve casing.

9. A packing for a rotating stem comprising a wall through which the stem passes, a collar on the stem beyond the wall end, a substantially solid washer seated between the collar and wall end, and a pressure device for forcing the wall and collar together to clamp the washer between them.

In testimony whereof, I sign this specification in the presence of two witnesses.

EVERETT P. ALLEN.

Witnesses:
M. SULLIVAN,
HENRY H. SHERWOOD.